(12) United States Patent
Wu et al.

(10) Patent No.: US 9,217,361 B2
(45) Date of Patent: Dec. 22, 2015

(54) TURBOCHARGING SYSTEM

(71) Applicant: GM GLOBAL TECHNOLOGY OPERATIONS LLC, Detroit, MI (US)

(72) Inventors: Ko-Jen Wu, Troy, MI (US); Dustin Loveland, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 13/959,178

(22) Filed: Aug. 5, 2013

(65) Prior Publication Data
US 2015/0034408 A1 Feb. 5, 2015

(51) Int. Cl.
| F02B 33/44 | (2006.01) |
| F02D 23/00 | (2006.01) |
| F02B 33/00 | (2006.01) |
| F02B 37/007 | (2006.01) |
| F02B 37/00 | (2006.01) |

(52) U.S. Cl.
CPC ............. *F02B 37/007* (2013.01); *F02B 37/002* (2013.01)

(58) Field of Classification Search
CPC .............................. F02B 37/002; F02B 37/007
USPC ............. 60/612, 602, 623, 323–324; 123/562
See application file for complete search history.

(56) References Cited

U.S. PATENT DOCUMENTS

| 3,292,364 A | * | 12/1966 | Cazier | 417/380 |
| 3,557,549 A | * | 1/1971 | Webster | 60/602 |
| 3,941,104 A | * | 3/1976 | Egli | 60/612 |
| 4,008,572 A | * | 2/1977 | Woollenweber, Jr. | 60/602 |
| 5,020,327 A | * | 6/1991 | Tashima et al. | 60/600 |
| 5,791,146 A | * | 8/1998 | Dungner | 60/605.2 |
| 6,237,335 B1 | * | 5/2001 | Lonnqvist | 60/605.2 |
| 6,324,847 B1 | * | 12/2001 | Pierpont | 60/605.2 |
| 6,694,735 B2 | * | 2/2004 | Sumser et al. | 60/605.2 |
| 6,715,289 B2 | * | 4/2004 | Mader et al. | 60/612 |
| 7,302,800 B2 | | 12/2007 | Klingel | |
| 7,644,585 B2 | * | 1/2010 | Haugen | 60/612 |
| 8,161,747 B2 | * | 4/2012 | Pierpont et al. | 60/605.2 |
| 8,499,559 B2 | * | 8/2013 | Axelsson et al. | 60/612 |
| 8,844,285 B2 | * | 9/2014 | An | 60/605.2 |
| 2006/0254273 A1 | * | 11/2006 | Grissom et al. | 60/602 |
| 2007/0062188 A1 | * | 3/2007 | Fry et al. | 60/599 |
| 2007/0074513 A1 | * | 4/2007 | Lamb et al. | 60/612 |
| 2015/0075159 A1 | * | 3/2015 | Kemmerling et al. | 60/602 |

* cited by examiner

*Primary Examiner* — Thai Ba Trieu
*Assistant Examiner* — Jason T Newton
(74) *Attorney, Agent, or Firm* — Quinn Law Group, PLLC

(57) ABSTRACT

An internal combustion engine includes a cylinder block defining a cylinder and a cylinder head mounted to the block. The cylinder head supplies air and fuel to the cylinder for combustion therein. The engine also includes an exhaust manifold operatively connected to the cylinder head and having a first outlet and a second outlet configured to exhaust post-combustion gasses from the cylinder. The engine also includes a turbocharging system configured to pressurize an airflow for delivery thereof to the cylinder. The turbocharging system includes a low-flow turbocharger driven by the post-combustion gasses from the first outlet to pressurize the airflow and a high-flow turbocharger driven by the post-combustion gasses from the second outlet to pressurize the airflow. The turbocharging system additionally includes a flow control device for selectively directing the post-combustion gasses to the low-flow and high-flow turbochargers. A vehicle employing such an engine is also disclosed.

16 Claims, 4 Drawing Sheets

TURBOCHARGING SYSTEM

TECHNICAL FIELD

The present disclosure relates to a turbocharging system for an internal combustion engine.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A typical turbocharger includes a central shaft that is supported by one or more bearings and transmits rotational motion between an exhaust-driven turbine wheel and an air compressor wheel. Both the turbine and compressor wheels are fixed to the shaft, which in combination with various bearing components constitute the turbocharger's rotating assembly.

The inertia of such a rotating assembly typically impacts the response of a turbocharger, wherein the diameter of the turbine wheel is one of the main factors. On the other hand, because the turbocharger is generally efficient over a specific range of rotational speeds and airflows, the diameter of the turbine wheel is also a major factor behind generating the necessary airflow for increased engine power. Such considerations frequently demand a compromise between maximum engine power output and response.

SUMMARY

One embodiment of the disclosure is directed to an internal combustion engine that includes a cylinder block. The cylinder block defines a cylinder and a cylinder head mounted to the cylinder block. The cylinder head is configured to supply air and fuel to the cylinder for combustion therein is disclosed. The engine also includes an exhaust manifold operatively connected to the cylinder head. The exhaust manifold includes a first outlet and a second outlet, with each outlet being configured to exhaust post-combustion gasses from the cylinder. The engine also includes a turbocharging system configured to pressurize an airflow being received from the ambient for delivery to the cylinder. The turbocharging system includes a low-flow turbocharger configured to be driven by the post-combustion gasses from the first outlet in order to pressurize the airflow and discharge the pressurized airflow to the cylinder. The turbocharging system also includes a high-flow turbocharger configured to be driven by the post-combustion gasses from the second outlet in order to pressurize the airflow and discharge the pressurized airflow to the cylinder. The turbocharging system additionally includes a flow control device configured to selectively direct the post-combustion gasses to the low-flow turbocharger and the high-flow turbocharger.

The exhaust manifold may be integrated into the cylinder head. Additionally, the cylinder head may be integrated into or cast together with the cylinder block.

The flow control device may be attached directly to and also be in fluid communication with the second outlet.

The low-flow turbocharger may include a first twin-scroll turbine housing. Furthermore, the cylinder may include a first set of cylinders and a second set of cylinders. The exhaust manifold may be bifurcated to separately channel post-combustion gasses from the first set of cylinders to one scroll of the first twin-scroll turbine housing and post-combustion gasses from the second set of cylinders to the other scroll of the first twin-scroll turbine housing.

The high-flow turbocharger may include a second twin-scroll turbine housing. Furthermore, the cylinder may include a first set of cylinders and a second set of cylinders. Additionally, the integrated exhaust manifold may be bifurcated to separately channel post-combustion gasses from the first set of cylinders and post-combustion gasses from the second set of cylinders. Furthermore, the flow control device may include a bifurcated chamber configured to separately channel therethrough, after the bifurcated exhaust manifold, the post-combustion gasses of the first set of cylinders to one scroll of the second twin-scroll turbine housing and the post-combustion gasses of the second set of cylinders to the other scroll of the second twin-scroll turbine housing.

The engine may additionally include a programmable controller configured to regulate operation of the flow control device.

The controller may be programmed to close the flow control device to direct the post-combustion gasses to the low-flow turbocharger and open the control valve to direct the post-combustion gasses to the high-flow turbocharger.

The controller may also be programmed to close the flow control device below a predetermined flow rate of the post-combustion gas and open the flow control device at or above the predetermined flow rate.

Another embodiment of the present disclosure is directed to a vehicle employing the engine as described above.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
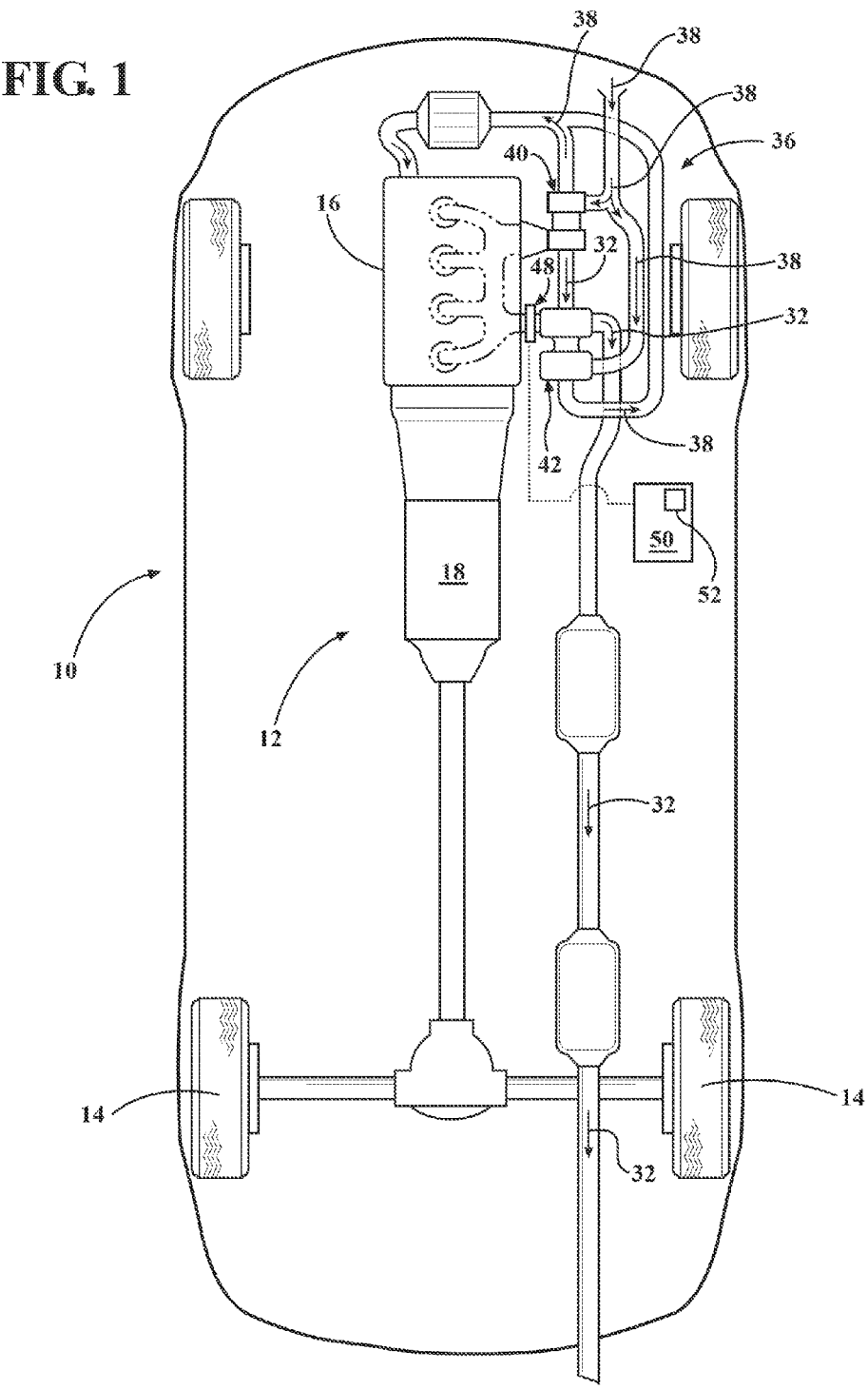
FIG. 1 is a schematic depiction of a vehicle having an engine with a two-stage turbocharging system according to the disclosure.

Referring to the drawings, wherein like reference numbers correspond to like or similar components throughout the several figures, FIG. 1 illustrates a vehicle 10 employing a powertrain 12 for propulsion thereof via driven wheels 14. As shown, the powertrain 12 includes an internal combustion engine 16, such as a spark- or compression-ignition type, and a transmission assembly 18 operatively connected thereto. The powertrain 12 may also include one or more electric motor/generators, none of which are shown, but the existence of which may be envisioned by those skilled in the art.

Figure 2:
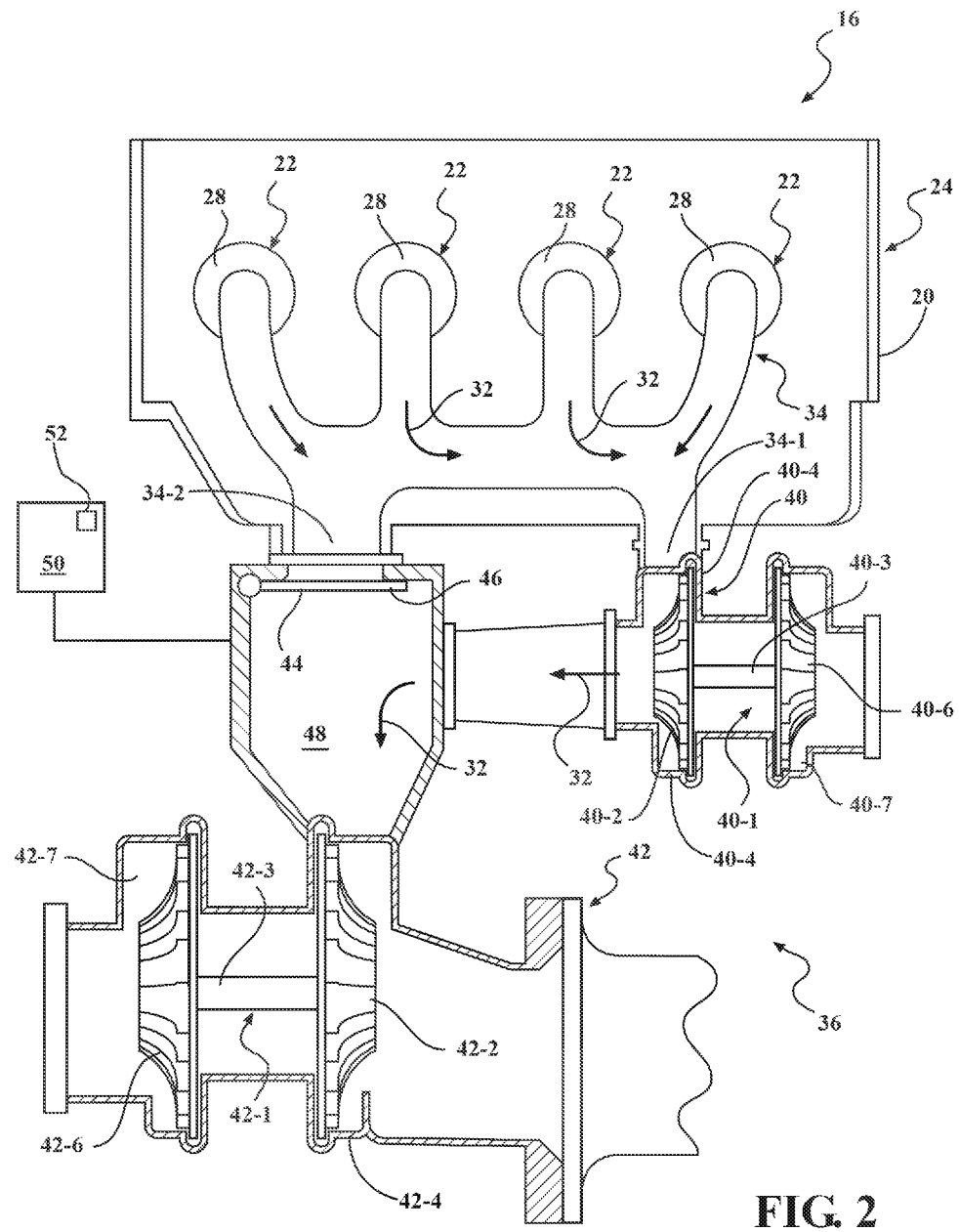
FIG. 2 is a schematic partially cross-sectional top view of an engine with a two-stage turbocharging system shown in FIG. 1 according to one embodiment of the disclosure.
Figure 3:
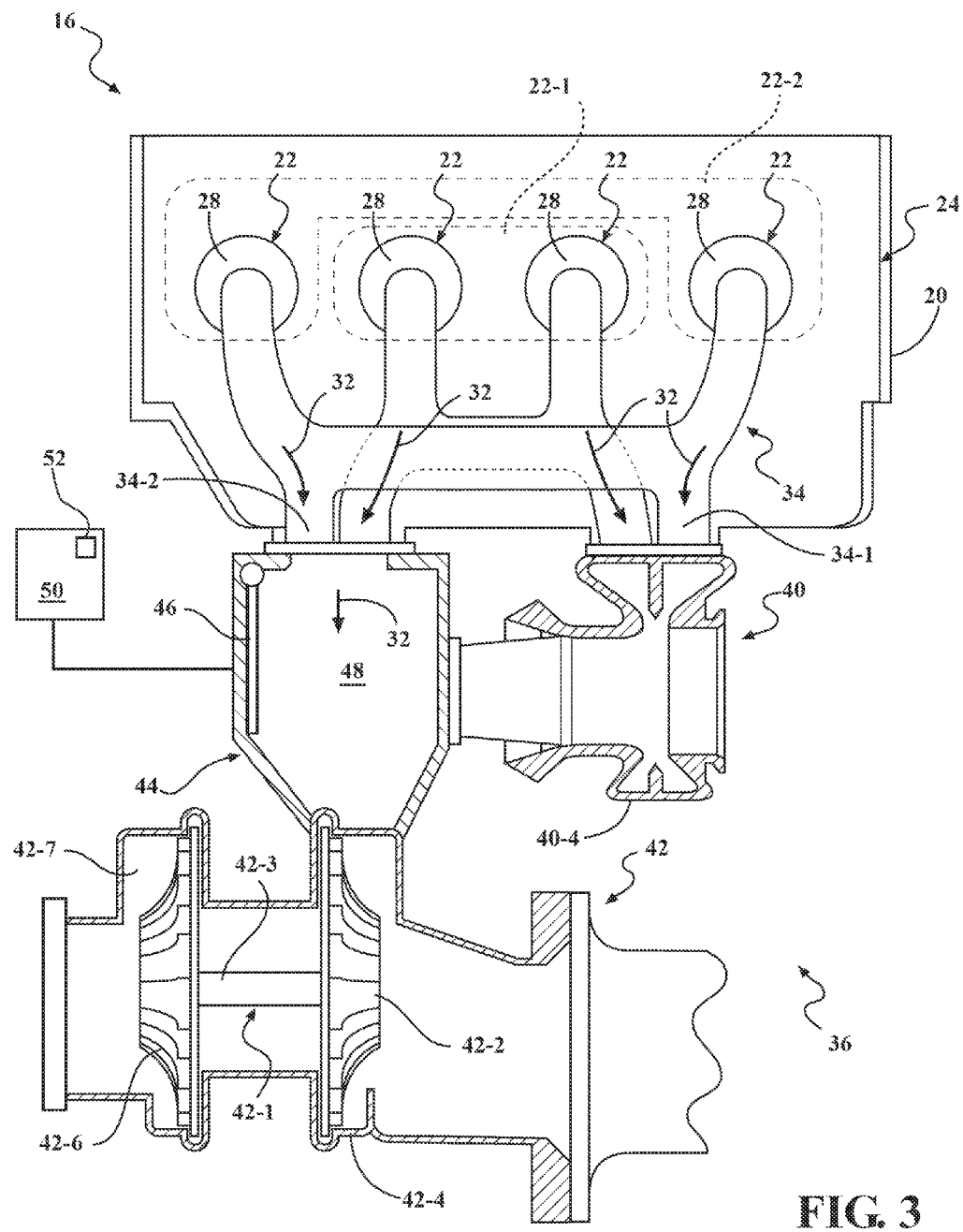
FIG. 3 is a schematic partially cross-sectional top view of an engine with a two-stage turbocharging system shown in FIG. 1 according to another embodiment of the disclosure.
Figure 4:
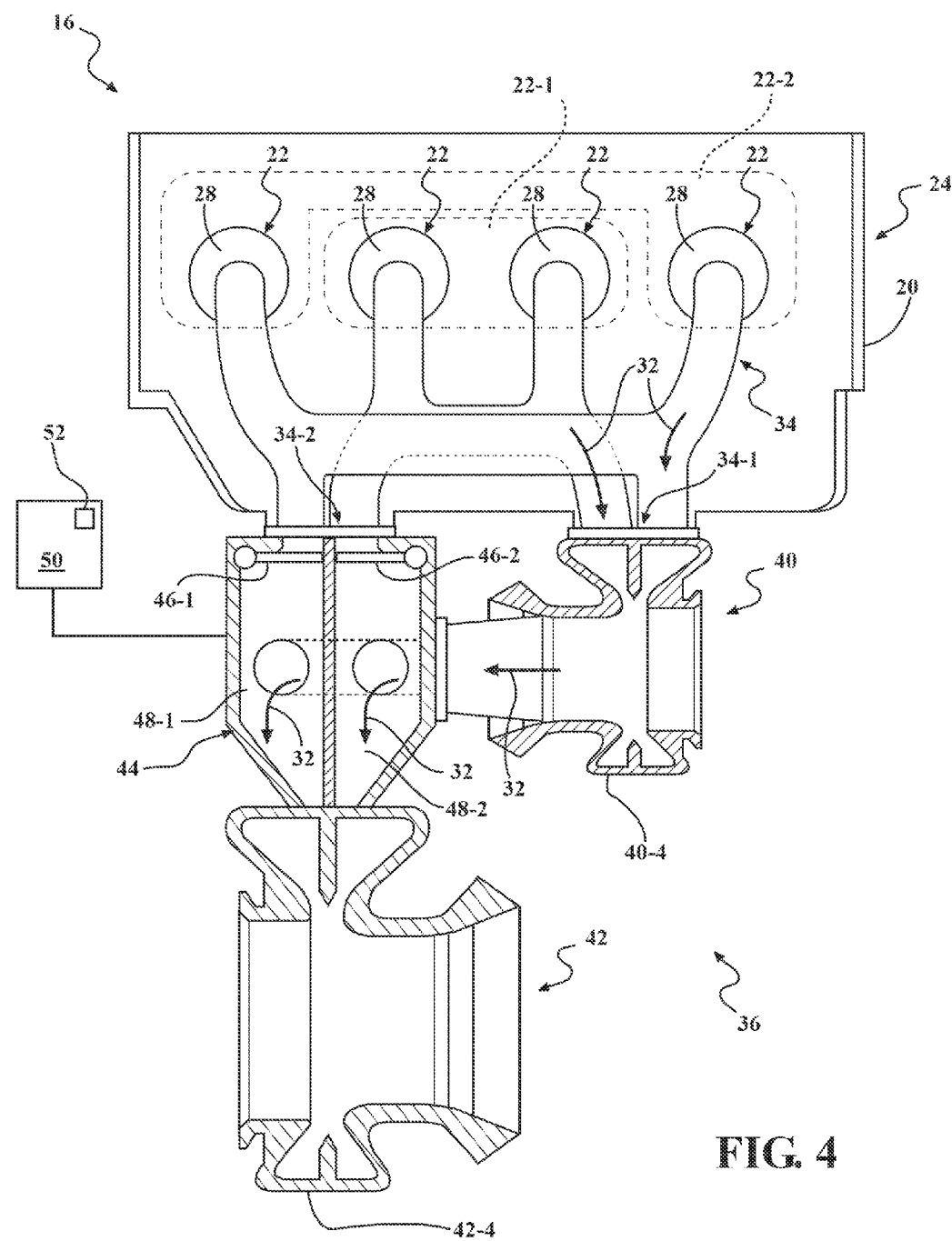
FIG. 4 is a schematic partially cross-sectional top view of an engine with a two-stage turbocharging system shown in FIG. 1 according to yet another embodiment of the disclosure.

As shown in FIG. 2, the engine 16 includes a cylinder block 20 with a plurality of cylinders 22 arranged therein and a cylinder head 24 that is mounted on the cylinder block. As shown in FIGS. 2-4, the cylinder head 24 may be integrated into or cast together with the cylinder block 20. The cylinder head 24 receives air and fuel to be used inside the cylinders 22 for subsequent combustion. Each cylinder 22 includes a piston, which is not specifically shown, but known to those skilled in the art to reciprocate therein. Combustion chambers 28 are formed within the cylinders 22 between the bottom surface of the cylinder head 24 and the tops of the pistons. As known by those skilled in the art, each of the combustion chambers 28 receives fuel and air from the cylinder head 24 that form a fuel-air mixture for subsequent combustion inside the subject combustion chamber. Although an in-line four-cylinder engine is shown, nothing precludes the present disclosure from being applied to an engine having a different number and/or arrangement of cylinders.

The engine 10 also includes a crankshaft (not shown) configured to rotate within the cylinder block 20. As known to those skilled in the art, the crankshaft is rotated by the pistons as a result of an appropriately proportioned fuel-air mixture being burned in the combustion chambers 28. After the air-fuel mixture is burned inside a specific combustion chamber 28, the reciprocating motion of a particular piston serves to exhaust post-combustion gasses 32 from the respective cylinder 22. The cylinder head 24 is also configured to exhaust post-combustion gasses 32 from the combustion chambers 28 via an exhaust manifold 34. As shown in FIG. 2, the exhaust manifold 34 may be internally cast, i.e., integrated, into the cylinder head 24. Exhaust runners from different cylinders 22 are joined together in the exhaust manifold 34, thus allowing two separate outlets, a first outlet 34-1 and a second outlet 34-2, to be formed for scavenging the exhaust post-combustion gasses 32 from all cylinders 22.

The engine 10 also includes a turbocharging system 36 configured to develop boost pressure, i.e., pressurize an airflow 38 that is received from the ambient, for delivery to the cylinders 22. The turbocharging system 36 is configured as a two-stage forced induction arrangement for the engine 10. The turbocharging system 36 includes a low-flow turbocharger 40 that is in fluid communication with the exhaust manifold 34 and configured to be driven by the post-combustion gasses 32 from the first outlet 34-1. The low-flow turbocharger 40 pressurizes and discharges the airflow 38 to the cylinders 22 at lower flow rates of the post-combustion gasses 32, which are typically generated at lower rotational speeds, such as below approximately 3,000 RPM, of the engine 10.

The turbocharging system 36 also includes a high-flow turbocharger 42 that is in fluid communication with the exhaust manifold 34 and configured to be driven by the post-combustion gasses 32 from the second outlet 34-2. The high-flow turbocharger 42 pressurizes and discharges the airflow 38 to the cylinders 22 at higher flow rates of the post-combustion gasses 32, which are typically generated at intermediate and higher rotational speeds, such as around 3,000 RPM and above, of the engine 10. To support such distinct engine speed ranges and rates of airflow 38, the low-flow turbocharger 40 is typically sized comparatively smaller and thus has a smaller rotating inertia than the high-flow turbocharger 42. As such, the exhaust manifold 34 is operatively connected to the cylinder head 24, while the two separate outlets 34-1 and 34-2 permit two turbochargers 40, 42 to be mounted sufficiently apart.

Generally, in a two-stage forced induction arrangement the output pressure from multiple turbochargers is greater than can be provided by a single turbocharger. Such a two-stage forced induction arrangement may be configured to operate as a sequential system, wherein at least in some, typically higher, engine speed ranges both low- and high-flow turbochargers operate simultaneously, i.e., with operational overlap. A two-stage forced induction arrangement may also be configured to generate boost pressure as a staged system, i.e., where the low- and high-flow turbochargers generate boost pressure in sequence, without any operational overlap. In such two-stage forced induction arrangements, the first, larger flow turbocharger boosts intake air pressure as much as possible, for example to three times the intake pressure, and the subsequent smaller flow turbocharger(s) takes the intake air charge from the previous stage and compresses it further, for example to an additional three times intake pressure, for a total boost of nine times atmospheric pressure.

As shown in FIGS. 2-4, each of the turbochargers 40 and 42 includes a rotating assembly, rotating assembly 40-1 and rotating assembly 42-1, respectively. The rotating assemblies 40-1 and 42-1 include respective turbine wheels 40-2 and 42-2 mounted on shafts 40-3 and 42-3, respectively. The turbine wheels 40-2 and 42-2 are configured to be rotated along with the respective shafts 40-3, 42-3 by post-combustion gasses 32 emitted from the cylinders 22. The rotating assembly 42-1 is physically larger than rotating assembly 40-1 such that the high-flow turbocharger 42 may generate the comparatively higher air flow rates required therefrom. The turbine wheels 40-2 and 42-2 are typically constructed from a temperature and oxidation resistant material, such as a nickel-chromium-based "inconel" super-alloy to reliably withstand temperatures of the post-combustion gasses 32, which in some engines may approach 2,000 degrees Fahrenheit.

The turbine wheels 40-2 and 42-2 are disposed inside respective turbine housings 40-4 and 42-4 that are typically constructed from cast iron or steel include an appropriately configured, i.e., designed and sized, respective turbine volutes or scrolls. The turbine scrolls of the turbine housings 40-4 and 42-4 receive the post-combustion gasses 32 and direct the gasses to the respective turbine wheels 40-2 and 42-2. The turbine scrolls are configured to achieve specific performance characteristics, such as efficiency and response, of the respective turbocharger 40 and 42. Each of the turbine housings 40-4 and 42-4 may also include an integrated waste-gate valve (not shown) to facilitate more precise control over boost pressures generated by the turbocharging system 36, as well as the transition and overlap between operation of the low-flow turbocharger 40 and the high-flow turbocharger 42. However, a flow control device 44 that is described in detail below may serve as a waste-gate for the low-flow turbocharger 40.

Each rotating assembly 40-1, 42-1 also includes a compressor wheel 40-6 and 42-6 mounted on the respective shaft 40-3, 42-3. The compressor wheels 40-6 and 42-6 are configured to pressurize the airflow 38 being received from the ambient for eventual delivery to the cylinders 22. The compressor wheels 40-6 and 42-6 are disposed inside a respective compressor cover 40-7 and 42-7. Each compressor cover 40-7, 42-7 is typically constructed from aluminum and includes a respective compressor volute or scroll. As understood by those skilled in the art, the variable flow and force of the post-combustion gasses 32 influences the amount of boost pressure that may be generated by each compressor wheel 40-6 and 42-6 of the respective turbochargers 40 and 42 throughout the operating range of the engine 16. Each compressor wheel 40-6, 42-6 is typically formed from a high-strength aluminum alloy that provides the compressor wheel with reduced rotating inertia and quicker spin-up response.

The engine 16 additionally includes an induction system that may include an air duct and an air filter upstream of the turbochargers 40, 42 configured to channel the airflow 38 from the ambient to the turbocharging system 36. Although the induction system is not shown, the existence of such would be appreciated by those skilled in the art. Each of the turbochargers 40, 42 may also be fluidly connected to an intake manifold (not shown) that is configured to distribute the pressurized airflow 38 to each of the cylinders 22 for mixing with an appropriate amount of fuel and subsequent combustion of the resultant fuel-air mixture.

As shown in FIGS. 2-4, the turbocharging system 36 also includes a flow control device 44. The flow control device 44 is mounted to the cylinder head 24 and is attached directly to and is in fluid communication with the second outlet 34-2 of the exhaust manifold 34. The high-flow turbocharger 42 is mounted to the flow control device 44 such that the post-combustion gasses 32 may only access the high-flow turbocharger by first passing through the flow control device. A fluid flow path out of the first manifold outlet 34-1 is maintained unobstructed so as to supply the post-combustion gasses 32 to the low-flow turbocharger 40, while another fluid flow path from the second manifold outlet 34-2 is connected to the flow control device 44.

The flow control device 44 includes a valve 46 and a chamber 48, and is used to selectively open and close the fluid flow path from the second manifold outlet 34-2 into the high-flow turbocharger 42. The flow control device 44 is also open, i.e., fluidly connected with the low-flow turbine housing 40-4. As shown, the valve 46 may be configured as a door designed to pivot around an axis X in order to selectively open and close the flow control device 44. When the flow control device 44 is closed and the valve 46 blocks the second manifold outlet 34-2, the post-combustion gasses 32 naturally flow into the low-flow turbocharger 40. Following the low-flow turbocharger 40, the post-combustion gas 32 is exited from the low-flow turbine housing 40-4 into the high-flow turbine housing 42-4 downstream of the valve 46. On the other hand, because the chamber 48 is fluidly connected to low-flow turbine, when the valve 46 fully opens the second manifold outlet 34-2, pressure across the two sides of the low-flow turbine housing 40-4 equalizes, the post-combustion gasses 32 will naturally flow into the high-flow turbine housing 42-4.

The valve 46 can be sized in order to select the operational transition point between low-flow turbine wheel 40-2 wheel and high-flow turbine wheel 42-2. Also, opening into the flow control device 44 may be modulated via the valve 46 to adjust or vary the flow of post-combustion gasses 32 through the low-flow turbine housing 40-4, thus varying the amount of overlap between operation of the low- and high-flow turbochargers 40, 42. Also the relative sizes of the low- and high-flow turbine housings 40-4, 42-4 are selected to vary the operation transition point between low-flow turbine wheel 40-2 and high-flow turbine wheel 42-2. Accordingly, the opening into the chamber 48 of the valve 46 can also be controlled to effect sequential operation of the two turbochargers 40, 42. Through such an arrangement, the flow control device 44 is configured to selectively direct the post-combustion gas 32 to the low-flow turbocharger 40 and the high-flow turbocharger 42, thus effectively transitioning between the low-flow turbocharger and the high-flow turbocharger during operation of the engine 16.

The vehicle 10 may additionally include a programmable controller 50 configured to regulate operation of the engine, such as by controlling an amount of fuel being injected into the cylinders 22 for mixing and subsequent combustion with the pressurized airflow 38. The controller 50 is also configured to regulate the flow control device 44. More particularly, the controller 50 is programmed to close the flow control device 44 (as shown in FIG. 2) to direct the post-combustion gasses 32 to the low-flow turbocharger 40 and open the control valve (as shown in FIG. 3) to direct the post-combustion gasses to the high-flow turbocharger 42 depending on operating parameters, such as the load, temperature, and rotational speed, of the engine 16. Accordingly, the controller 50 may be programmed to close the flow control device 44 below a predetermined flow rate 52 of the post-combustion gasses 32 and open the control valve at or above the predetermined flow rate.

The predetermined flow rate 52 of the post-combustion gasses 32 may be a specific flow rate value below which the post-combustion gasses of the subject engine 16 have sufficient energy to spin the low-flow turbocharger 40 up at a desired rate in order to provide the desired boost pressure within a desired timeframe, but insufficient to similarly spin up the higher inertia high-flow turbocharger 42. The subject predetermined flow rate 52 of the post-combustion gasses 32 may be identified through calculations and then verified through an empirical procedure during testing of the actual engine 16, both on a test stand and in the vehicle 10.

As shown in FIG. 2, each of the turbine housing 40-4 of the low-flow turbocharger 40 and the turbine housing 42-4 of the high-flow turbocharger 42 can have a standard or baseline single-scroll configuration. Optionally, as shown in FIG. 3, the turbine housing 40-4 of the low-flow turbocharger 40 can have a first twin-scroll configuration. Similarly, as also shown in FIG. 4, the turbine housing 42-4 of the high-flow turbocharger 42 can have a second twin-scroll configuration. The low-flow turbocharger 40 with the first twin-scroll configuration may be employed in combination with the high-flow turbocharger 42 having a single-scroll configuration.

An engine's valve timing may be configured such that exhaust valves in different cylinders can be opened at the same time, overlapping at the end of a power stroke in one cylinder and the end of an exhaust stroke in another. Hence, such overlapping post-combustion gas pulses from the engine's cylinders may interfere and reduce the pulse energy available to drive the turbocharger's turbine wheel. To address such concerns, as generally applicable to each of the turbochargers 40 and 42, twin-scroll or divided turbine housings include two exhaust gas inlets into the turbine housing and two nozzles. Typically, twin-scroll turbine housings have one smaller, sharper angled nozzle for quick response and a larger, less angled nozzle for peak performance.

A twin-scroll turbine housing is typically paired with a specifically designed, bifurcated exhaust manifold designed to properly group an engine's cylinders so that maximum pulse energy can be applied to the turbine wheel for improved engine operating efficiency. Such an exhaust manifold physically separates exhaust channels for cylinders which can interfere with each other during operation of the engine, so that the pulsating post-combustion gasses flow to separate scrolls of the twin-scroll turbine housing. When paired in such fashion, the twin-scroll turbine housing and bifurcated exhaust manifold permit the engine to efficiently utilize exhaust scavenging techniques. Some of the benefits of such efficient exhaust scavenging may include improved turbine efficiency that reduces lag in turbocharger response and reduction in exhaust gas temperatures and NOx emissions.

In accordance with the above practice, as shown in FIGS. 3-4, on the exhaust side of the cylinder head 24, the cylinders 22 may be separated into a first set of cylinders 22-1 and a second set of cylinders 22-2 such that the individual cylinders do not interfere with each other during the exhaust part of the combustion cycle. To additionally take advantage of twin-scroll configuration of the turbine scrolls 40-4 and 42-4, the exhaust manifold 34 may be bifurcated to separately channel post-combustion gasses 32 from the first set of cylinders 22-1 to one scroll of the first twin-scroll turbine housing 40-4 and post-combustion gasses from the second set of cylinders 22-2 to the other scroll of the first twin-scroll turbine housing at the first outlet 34-1.

Similar to the above, and as shown in FIG. 4, the exhaust manifold 34 may be bifurcated to separately channel post-combustion gasses 32 from the first set of cylinders 22-1 to one scroll of the second twin-scroll turbine housing 42-4 and post-combustion gasses from the second set of cylinders 22-2 to the other scroll of the second twin-scroll turbine housing at the second outlet 34-2. Additionally, because the flow control device 44 is mounted to the cylinder head 24 and is attached directly to the second outlet 34-2, the chamber 48 may be bifurcated into sub-chambers 48-1 and 48-2 and include individual valves 46-1 and 46-2, respectively, to separately channel the post-combustion gasses 32 therethrough on the way to the twin-scroll turbine housing 42-4. Accordingly, following the bifurcated second outlet 34-2 of the exhaust manifold 34, the post-combustion gasses of the first set of cylinders 22-1 may be separately channeled via the bifurcated chamber 48 to one scroll of the second twin-scroll turbine housing 42-4 and the post-combustion gasses of the second set of cylinders 22-2 to the other scroll of the second twin-scroll turbine housing.

A typical inline 4-cylinder engine having a firing order of 1-3-4-2 is shown in FIGS. 2-4. As shown, post-combustion gasses 32 from consecutive firing cylinders are separated into separate flow branches and flows in the same branch are spaced out in time, achieving the goal of maintaining high exhaust pressure pulses. For the inline 4-cylinder engine with a firing order of 1-3-4-2, the runners from cylinder #1 and #4 are grouped into one branch and runners from cylinder #2 and #3 grouped into another branch. Each branch has two exits, one at the first outlet 34-1 and one at the second outlet 34-2, leading to the two separate turbochargers 40, 42. Each exit from one branch is paired with an exit from the other branch to form a single flange face at each outlet 34-1 and 34-2. Port openings at the entry to the turbocharger 40 and the flow control device 44 need to be shaped to match the corresponding flange faces at the outlets 34-1, 34-2 for efficient flow of the post-combustion gasses 32.

Overall, the two separate outlets 34-1 and 34-2 of the exhaust manifold 34 permit the low-flow turbocharger 40 and the high-flow turbocharger 42 of the two-stage turbocharging system 36 to be mounted sufficiently apart and permit incorporation of the twin-scroll technology. As such, the twin-scroll turbine housing 40-4 of the low-flow turbocharger 40, either alone or with the twin-scroll turbine housing 42-4 of the high-flow turbocharger 42, may be exploited to enhance flow management of the post-combustion gas 32 and thereby improve operating efficiency of the engine 16. Additionally, the two-stage turbocharging system 36 is intended to enable engine downsizing as a result of the system's capabilities to generate higher boost pressures over a broader flow range. Furthermore, for spark-ignition engines, twin-scroll technology can be employed in the two-stage turbocharging system to control charge temperatures of the pressurized airflow, thus permitting higher boost pressures to be realized at higher levels of engine output torque.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
   a cylinder block defining at least one cylinder;
   a cylinder head mounted to the cylinder block and configured to supply air and fuel to the cylinder for combustion therein;
   an exhaust manifold operatively connected to the cylinder head and having a first outlet and a second outlet, wherein each of the first and second outlets is configured to exhaust post-combustion gasses from the cylinder; and
   a turbocharging system configured to pressurize an airflow being received from the ambient for delivery to the cylinder, the turbocharging system including:
      a low-flow turbocharger configured to be driven by the post-combustion gasses from the first outlet in order to pressurize the airflow and discharge the pressurized airflow to the cylinder;
      a high-flow turbocharger configured to be driven by the post-combustion gasses from the second outlet in order to pressurize the airflow and discharge the pressurized airflow to the cylinder; and
      a flow control device in fluid communication with the second outlet, fluidly open to the low-flow turbocharger, and configured to selectively open and close flow of the post-combustion gasses from the second outlet into the high-flow turbocharger, to thereby selectively direct the post-combustion gasses to the low-flow turbocharger and the high-flow turbocharger;
   wherein:
      the low-flow turbocharger includes a twin-scroll turbine housing;
      the at least one cylinder includes a first set of cylinders and a second set of cylinders; and
      the exhaust manifold is bifurcated to separately channel post-combustion gasses from the first set of cylinders to one scroll of the twin-scroll turbine housing of the low-flow turbocharger and post-combustion gasses from the second set of cylinders to the other scroll of the twin-scroll turbine housing of the low-flow turbocharger.

2. The engine of claim 1, wherein the exhaust manifold is integrated into the cylinder head and/or the cylinder head is integrated with the cylinder block.

3. The engine of claim 1, wherein the flow control device is attached directly to and is in fluid communication with the second outlet.

4. The engine of claim 1, wherein the high-flow turbocharger includes a second twin-scroll turbine housing.

5. The engine of claim 4, wherein:
the at least one cylinder includes a first set of cylinders and a second set of cylinders;
the exhaust manifold is bifurcated to separately channel post-combustion gasses from the first set of cylinders and post-combustion gasses from the second set of cylinders; and
the flow control device includes a chamber bifurcated into sub-chambers and each sub-chamber includes an individual valve configured to separately channel therethrough, after the bifurcated exhaust manifold, the post-combustion gasses of the first set of cylinders to one scroll of the twin-scroll turbine housing of the high-flow turbocharger and the post-combustion gasses of the second set of cylinders to the other scroll of the twin-scroll turbine housing of the high-flow turbocharger.

6. The engine of claim 1, further comprising a programmable controller configured to regulate operation of the flow control device.

7. The engine of claim 6, wherein the controller is programmed to close the flow control device to close the second outlet and direct the post-combustion gasses to the low-flow turbocharger from the first outlet and open the flow control device to direct the post-combustion gasses from the second outlet to the high-flow turbocharger.

8. The engine of claim 7, wherein the controller is programmed to close the flow control device below a predetermined flow rate of the post-combustion gasses exhausted from the at least one cylinder and open the flow control device at or above the predetermined flow rate.

9. A vehicle comprising:
a driven wheel; and
a powertrain including an internal combustion engine and a transmission assembly operatively connected to the engine and configured to transmit engine torque to the driven wheel, the engine including:
a cylinder block defining at least one cylinder;
a cylinder head mounted to the cylinder block and configured to supply air and fuel to the cylinder for combustion therein;
an exhaust manifold operatively connected to the cylinder head and having a first outlet and a second outlet, wherein each of the first and second outlets is configured to exhaust post-combustion gasses from the cylinder; and
a turbocharging system configured to pressurize an airflow being received from the ambient for delivery to the cylinder, the turbocharging system including:
a low-flow turbocharger configured to be driven by the post-combustion gasses from the first outlet in order to pressurize the airflow and discharge the pressurized airflow to the cylinder;
a high-flow turbocharger configured to be driven by the post-combustion gasses from the second outlet in order to pressurize the airflow and discharge the pressurized airflow to the cylinder; and
a flow control device in fluid communication with the second outlet, fluidly open to the low-flow turbocharger, and configured to selectively open and close flow of the post-combustion gasses from the second outlet into the high-flow turbocharger, to thereby selectively direct the post-combustion gasses to the low-flow turbocharger and the high-flow turbocharger;
wherein:
the low-flow turbocharger includes a twin-scroll turbine housing;
the at least one cylinder includes a first set of cylinders and a second set of cylinders; and
the exhaust manifold is bifurcated to separately channel post-combustion gasses from the first set of cylinders to one scroll of the twin-scroll turbine housing of the low-flow turbocharger and post-combustion gasses from the second set of cylinders to the other scroll of the twin-scroll turbine housing of the low-flow turbocharger.

10. The vehicle of claim 9, wherein the exhaust manifold is integrated into the cylinder head and/or the cylinder head is integrated with the cylinder block.

11. The vehicle of claim 9, wherein the flow control device is attached directly to and is in fluid communication with the second outlet.

12. The vehicle of claim 9, wherein the high-flow turbocharger includes a twin-scroll turbine housing.

13. The vehicle of claim 12, wherein:
the at least one cylinder includes a first set of cylinders and a second set of cylinders;
the exhaust manifold is bifurcated to separately channel post-combustion gasses from the first set of cylinders and post-combustion gasses from the second set of cylinders; and
the flow control device includes a chamber bifurcated into sub-chambers and each sub-chamber includes an individual valve configured to separately channel therethrough, after the bifurcated exhaust manifold, the post-combustion gasses of the first set of cylinders to one scroll of the twin-scroll turbine housing of the high-flow turbocharger and the post-combustion gasses of the second set of cylinders to the other scroll of the twin-scroll turbine housing of the high-flow turbocharger.

14. The vehicle of claim 9, further comprising a programmable controller operatively connected to the engine and configured to regulate operation of the flow control device.

15. The vehicle of claim 14, wherein the controller is programmed to close the flow control device to close the second outlet and direct the post-combustion gasses to the low-flow turbocharger from the first outlet and open the flow control device to direct the post-combustion gasses from the second outlet to the high-flow turbocharger.

16. The vehicle of claim 15, wherein the controller is programmed to close the flow control device below a predetermined flow rate of the post-combustion gasses exhausted from the at least one cylinder and open the flow control device at or above the predetermined flow rate.

* * * * *